United States Patent
Coleman et al.

(10) Patent No.: US 10,894,924 B2
(45) Date of Patent: Jan. 19, 2021

(54) MULTI-STAGE UPGRADING OF HYDROCARBON PYROLYSIS TAR USING RECYCLED INTERSTAGE PRODUCT

(71) Applicant: ExxonMobil Chemical Patents Inc., Baytown, TX (US)

(72) Inventors: John S. Coleman, Houston, TX (US); Kapil Kandel, Humble, TX (US); Subramanya V. Nayak, Buffalo Grove, IL (US); Teng Xu, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/025,622

(22) Filed: Jul. 2, 2018

(65) Prior Publication Data

US 2019/0016975 A1   Jan. 17, 2019

Related U.S. Application Data

(60) Provisional application No. 62/532,552, filed on Jul. 14, 2017, provisional application No. 62/532,575, filed on Jul. 14, 2017.

(51) Int. Cl.
*C10G 69/06* (2006.01)
*C10G 65/02* (2006.01)
(Continued)

(52) U.S. Cl.
CPC ............. *C10G 69/06* (2013.01); *C10G 65/02* (2013.01); *C10G 65/10* (2013.01); *C10G 65/12* (2013.01); *C10G 67/02* (2013.01); *B01J 23/28* (2013.01); *B01J 23/44* (2013.01); *B01J 23/745* (2013.01); *B01J 23/75* (2013.01); *B01J 23/755* (2013.01); *C10G 2300/206* (2013.01); *C10G 2300/207* (2013.01); *C10G 2300/301* (2013.01); *C10G 2300/302* (2013.01); *C10G 2300/4006* (2013.01); *C10G 2300/4018* (2013.01); *C10G 2300/802* (2013.01)

(58) Field of Classification Search
CPC ........ C10G 69/06; C10G 67/02; C10G 65/02; C10G 65/10; C10G 65/12; C10G 2300/4018; C10G 2300/206; C10G 2300/802; C10G 2300/4006; C10G 2300/302; C10G 2300/301; C10G 2300/207
See application file for complete search history.

(56) References Cited

U.S. PATENT DOCUMENTS 5,871,634 A    2/1999  Wiehe et al.
6,454,932 B1 * 9/2002  Baldassari ............. C10G 65/10
                                                     208/153

(Continued)

OTHER PUBLICATIONS

U.S. Appl. No. 62/380,538, filed Aug. 29, 2016.
(Continued)

*Primary Examiner* — Renee Robinson

(57) ABSTRACT

A multi-stage process is described for upgrading pyrolysis tar, such as steam cracker tar, by hydroprocessing in at least two stages. Hydroprocessing in a first stage is performed in the presence of a utility fluid. The utility fluid has a boiling point distribution from about 120° C. to about 480° C. and is separated from the first stage product.

20 Claims, 2 Drawing Sheets

(51) Int. Cl.

| | |
|---|---|
| *C10G 65/10* | (2006.01) |
| *C10G 65/12* | (2006.01) |
| *C10G 67/02* | (2006.01) |
| *B01J 23/28* | (2006.01) |
| *B01J 23/44* | (2006.01) |
| *B01J 23/745* | (2006.01) |
| *B01J 23/75* | (2006.01) |
| *B01J 23/755* | (2006.01) |

(56) References Cited

U.S. PATENT DOCUMENTS

| | | | |
|---|---|---|---|
| 9,090,835 | B2 | 7/2015 | Beech, Jr. et al. |
| 9,090,836 | B2 | 7/2015 | Brown et al. |
| 9,102,884 | B2 | 8/2015 | Xu et al. |
| 9,580,523 | B2 | 2/2017 | Wong et al. |
| 9,637,694 | B2 | 5/2017 | Evans et al. |
| 9,657,239 | B2 | 5/2017 | Beech, Jr. et al. |
| 2012/0261307 | A1 | 10/2012 | Joseck et al. |
| 2013/0081979 | A1 | 4/2013 | Brown et al. |
| 2014/0061094 | A1 | 3/2014 | Xu et al. |
| 2014/0061095 | A1 | 3/2014 | Beech, Jr. et al. |
| 2014/0061096 | A1* | 3/2014 | Brown .................. C10G 69/06 208/73 |
| 2014/0061100 | A1 | 3/2014 | Lattner et al. |
| 2014/0174980 | A1 | 6/2014 | Brown et al. |
| 2015/0141717 | A1 | 5/2015 | Frey et al. |
| 2015/0315496 | A1 | 11/2015 | Soultanidis et al. |
| 2015/0344785 | A1 | 12/2015 | Soultanidis et al. |
| 2015/0344790 | A1 | 12/2015 | Ferrughelli et al. |
| 2015/0361354 | A1 | 12/2015 | Xu et al. |
| 2015/0361359 | A1 | 12/2015 | Beech, Jr. et al. |
| 2016/0115399 | A1 | 4/2016 | Banerjee et al. |
| 2016/0122667 | A1 | 5/2016 | Evans et al. |
| 2016/0177205 | A1 | 6/2016 | Evans et al. |
| 2017/0002273 | A1 | 1/2017 | Rubin-Pitel et al. |

OTHER PUBLICATIONS

Pruden, B.B., et al. "Heat of Reaction and Vaporization of Feed and Product in the Thermal Hydrocracking of Athabasca Bitumen", Canmet report—Canada, Centre for Meral and Energy Technology, vol. 76, Issue 30 of Canmet report, 1976.

Marsh, H., et al. Introduction to Carbon Science, Chapter 2 H. Marsh (Editor) Mechanism of Formation of Isotropic and Anisotropic Carbons, Butterworths, London, 1989.

Breso-Femenia, E., et al. "Selective catalytic hydrogenation of polycyclic aromatic hydrocarbons promoted by ruthenium nanoparticles", Catal, Sci. Technol., 5, pp. 2741-2751, 2015.

Korre, S. C., et al., "Polynuclear Aromatic Hydrocarbons Hydrogenation, 1. Experimental Reaction Pathways and Kinetics", Ind. Eng. Chem. Res., 34(1), pp. 101-117, 1995.

* cited by examiner

MULTI-STAGE UPGRADING OF HYDROCARBON PYROLYSIS TAR USING RECYCLED INTERSTAGE PRODUCT

PRIORITY

This application claims priority to and the benefit of U.S. Provisional Patent Application No. 62/532,552, filed Jul. 14, 2017, and U.S. Provisional Patent Application No. 62/532,575, filed Jul. 14, 2017; which are incorporated herein by reference herein in their entireties.

FIELD OF THE INVENTION

The invention relates to a multi-stage process for hydroprocessing of pyrolysis tars, typically those resulting from steam cracking, so as to upgrade the tars to more useable products, such as fuel oil blendstocks.

BACKGROUND OF THE INVENTION

Pyrolysis processes, such as steam cracking, are utilized for converting saturated hydrocarbons to higher-value products such as light olefins, e.g., ethylene and propylene. Besides these useful products, hydrocarbon pyrolysis can also produce a significant amount of relatively low-value heavy products, such as pyrolysis tar. When the pyrolysis is steam cracking, the pyrolysis tar is identified as steam-cracker tar ("SCT").

Pyrolysis tar is a high-boiling, viscous, reactive material comprising complex, ringed and branched molecules that can polymerize and foul equipment. Pyrolysis tar also contains high molecular weight non-volatile components including paraffin insoluble compounds, such as pentane-insoluble compounds and heptane-insoluble compounds. Particularly challenging pyrolysis tars contain >0.5 wt %, sometimes >1.0 wt % or even >2.0 wt % of toluene insoluble compounds. The high molecular weight compounds are typically multi-ring structures that are also referred to as tar heavies ("TH"). These high molecular weight molecules can be generated during the pyrolysis process, and their high molecular weight leads to high viscosity, which limits desirable pyrolysis tar disposition options. For example, it is desirable to find higher-value uses for SCT, such as for fluxing with heavy hydrocarbons, especially heavy hydrocarbons of relatively high viscosity. It is also desirable to be able to blend SCT with one or more heavy oils, examples of which include bunker fuel, burner oil, heavy fuel oil (e.g., No. 5 or No. 6 fuel oil), high-sulfur fuel oil, low-sulfur oil, regular-sulfur fuel oil ("RSFO"), Emission Controlled Area fuel (ECA) with <0.1 wt % sulfur and the like.

One difficulty encountered when blending heavy hydrocarbons is fouling that results from precipitation of high molecular weight molecules, such as asphaltenes. In order to mitigate asphaltene precipitation, an Insolubility Number, $I_N$, and a Solvent Blend Number, $S_{BN}$, are determined for each blend component by the method described in U.S. Pat. No. 5,871,634, which is incorporated herein by reference in its entirety. Successful blending is accomplished with little or substantially no precipitation by combining the components in order of decreasing $S_{BN}$, so that the $S_{BN}$ of the blend is greater than the $I_N$ of any component of the blend. Pyrolysis tars generally have high $S_{BN}>135$ and high $I_N>80$ making them difficult to blend with other heavy hydrocarbons. Pyrolysis tars having $I_N>100$, e.g., >110 or >130, are particularly difficult to blend without phase separation.

Attempts at hydroprocessing pyrolysis tar to reduce viscosity and improve both IN and $S_{BN}$ have not led to a commercializable process, primarily because fouling of process equipment could not be substantially mitigated. For example, hydroprocessing neat SCT results in rapid catalyst coking when the hydroprocessing is carried out at a temperature in the range of about 250° C. to 380° C. and a pressure in the range of about 5400 kPa to 20,500 kPa, using a conventional hydroprocessing catalyst containing one or more of Co, Ni, or Mo. This coking has been attributed to the presence of TH in the SCT that leads to the formation of undesirable deposits (e.g., coke deposits) on the hydroprocessing catalyst and the reactor internals. As the amount of these deposits increases, the yield of the desired upgraded pyrolysis tar (upgraded SCT) decreases and the yield of undesirable byproducts increases. The hydroprocessing reactor pressure drop also increases, often to a point where the reactor is inoperable.

One approach taken to overcome these difficulties is disclosed in U.S. Pat. No. 9,102,884, which is incorporated herein by reference in its entirety. The application reports hydroprocessing SCT in the presence of a utility fluid comprising a significant amount of single and multi-ring aromatics to form an upgraded pyrolysis tar product. The upgraded pyrolysis tar product generally has a decreased viscosity, decreased atmospheric boiling point range, increased density and increased hydrogen content over that of the SCT feedstock, resulting in improved compatibility with fuel oil and blend-stocks. Additionally, efficiency advances involving recycling a portion of the upgraded pyrolysis tar product as utility fluid are reported in U.S. Patent Application Publication No. 2014/0061096, incorporated herein by reference in its entirety.

U.S. Patent Application Publication No. 2015/0315496, which is incorporated herein by reference in its entirety, reports separating and recycling a mid-cut utility fluid from the upgraded pyrolysis tar product. The utility fluid comprises ≥10.0 wt % aromatic and non-aromatic ring compounds and each of the following: (a) ≥1.0 wt % of 1.0 ring class compounds; (b) ≥5.0 wt % of 1.5 ring class compounds; (c) ≥5.0 wt % of 2.0 ring class compounds; and (d) ≥0.1 wt % of 5.0 ring class compounds.

U.S. Pat. No. 9,657,239, which is incorporated herein by reference in its entirety, reports separating and recycling a utility fluid from the upgraded pyrolysis tar product. The utility fluid contains 1-ring and/or 2-ring aromatics and has a final boiling point ≤430° C.

U.S. Pat. No. 9,637,694, which is incorporated herein by reference in its entirety, reports a process for upgrading pyrolysis tar, such as SCT, in the presence of a utility fluid which contains 2-ring and/or 3-ring aromatics and has solubility blending number (SBN) ≥120.

Provisional U.S. Patent Application 62/380,538 filed Aug. 29, 2016, which is incorporated herein by reference in its entirety, reports hydroprocessing conditions at higher pressure>8 MPa and a lower weight hourly space velocity of combined pyrolysis tar and utility fluid as low as 0.3 hr$^{-1}$.

Other references of interest include U.S. Pat. Nos. 9,580,523; 9,090,836; 9,090,835; U.S. Patent Application Publication Nos. 2013/0081979; 2014/0061100; 2014/0174980; 2015/0344790; 2015/0344785; 2015/0361354; 2015/0361359; and 2016/0177205.

Despite these advances, there remains a need for further improvements in tar hydroprocessing, especially tars having high IN values, which allow the production of upgraded tar product having lower viscosity and density specifications without compromising the lifetime of the hydroprocessing reactor.

SUMMARY OF THE INVENTION

It has been discovered that the viscosity and density of the upgraded tar product can be improved when tar hydroprocessing is separated into at least two hydroprocessing zones or stages. Hydroprocessing in at least two zones allows for hydroprocessing at pressures at or below 8 MPa and above 0.5 $hr^{-1}$ weight hour space velocity (WHSV). Advantageously, this allows for lower facility cost due to lower design pressure of equipment and for improved process reliability. Improved reliability includes less destruction of desirable utility fluid molecules and longer runtimes between need for catalyst regeneration or replacement.

It has further been discovered that a utility fluid with improved compatibility with the tar (e.g., pyrolysis tar) is advantageously obtained through use of the at least two hydroprocessing zones. In particular, the utility fluid is obtained from a first hydroprocessed product as a mid-cut stream after hydroprocessing in a first hydroprocessing zone. Additionally, the mid-cut stream is about 20 wt % to about 70 wt % of the first hydroprocessed product and has a boiling point distribution of about 120° C. to about 480° C. as measured according to ASTM D7500.

Accordingly, certain aspects of the invention relate to a hydrocarbon conversion process, comprising several steps. First, a feedstock comprising pyrolysis tar is hydroprocessed in a first hydroprocessing zone. In the first hydroprocessing zone, the feedstock is contacted with at least one hydroprocessing catalyst in the presence of a utility fluid and molecular hydrogen under catalytic hydroprocessing conditions to convert at least a portion of the feedstock to a first hydroprocessed product. Second, in one more separation stages, the first hydroprocessed product is separated into: (i) an overhead stream comprising ≥about 1.0 wt % of the first hydroprocessed product; (ii) a mid-cut stream comprising ≥about 20 wt % of the first hydroprocessed product and having a boiling point distribution from about 120° C. to about 480° C. as measured according to ASTM D7500; and (iii) a bottoms stream comprising ≥about 20 wt % of the first hydroprocessed product Third, at least a portion of the mid-cut stream is recycled for use as the utility fluid in the first hydroprocessing zone, and at least a portion of the bottoms stream is hydroprocessed in a second hydroprocessing zone. In the second hydroprocessing zone, the bottoms stream is contacted with at least one hydroprocessing catalyst in the presence of molecular hydrogen under catalytic hydroprocessing conditions to convert at least a portion of the bottoms stream to a second hydroprocessed product.

Additionally, a first hydroprocessed product is produced (from a first hydroprocessing stage) that can undergo more extensive hydrogenation in at least a second hydroprocessing stage to promote sulfur, density, and viscosity reduction. Accordingly, the invention also relates to a process where the second hydroprocessed product has one or more of i) a sulfur content 1.5 wt % or less, ii) product viscosity of 30 cSt at 50° C. or less, and iii) density at 15° C.≤1.00 g/cm³.

Advantageously, the mid-cut aromatic solvent molecules useful for utility fluid are not saturated in this manner. Surprisingly, the more extensive hydroprocessing in the at least second hydroprocessing stage without the mid-cut utility fluid molecules does not result in tar heavy (TH) precipitation or accelerated coke formation.

DETAILED DESCRIPTION

I. Multi-stage Hydroprocessing

Figure 1:
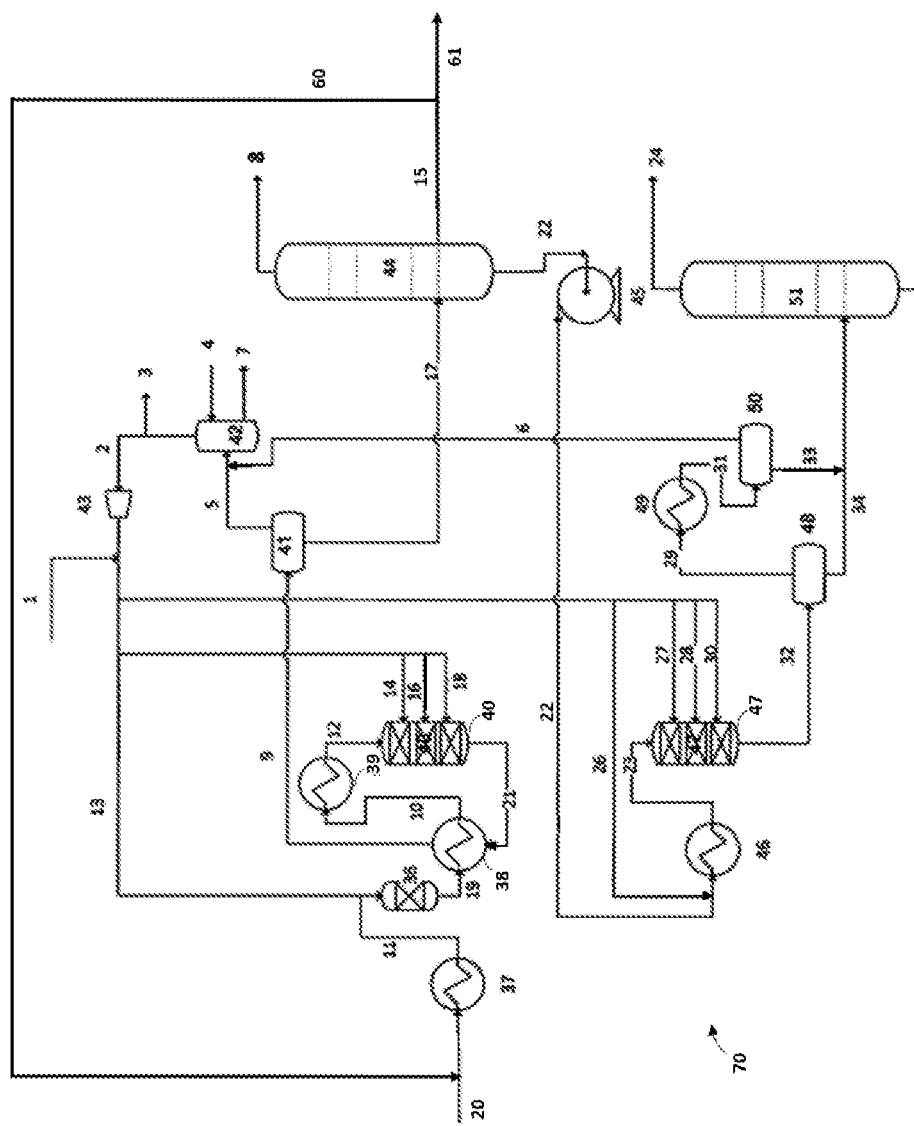
FIG. 1 schematically illustrates a multi-stage pyrolysis tar hydroprocessing process with interstage recycle.

Disclosed herein is a hydrocarbon conversion process in which a feedstock comprising pyrolysis tar hydrocarbon (e.g., ≥10.0 wt %) and a utility fluid is hydroprocessed in at least two hydroprocessing zones or stages in the presence of a treat gas comprising molecular hydrogen under catalytic hydroprocessing conditions to produce a hydroprocessed product. The utility fluid is obtained during the process as a mid-cut stream from the first hydroprocessed product produced in the first hydroprocessing zone. The process may be operated at different temperatures in the at least two hydroprocessing zones. In various aspects, the hydrocarbon conversion process is a solvent assisted tar conversion (SATC) process.

A SATC process is designed to convert tar, which may be a steam cracked tar or result from another pyrolysis process, such as biomass pyrolysis tar or coal pyrolysis tar, into lighter products similar to fuel oil. In some cases, it is desirable to further upgrade the tar to have more molecules boiling in the distillate range. SATC is proven to be effective for drastic viscosity reduction from as high as 500,000 to 15 cSt at 50° C. with more than 90% sulfur conversion. The SATC reaction mechanism and kinetics are not straightforward due to the complex nature of tar, and due to the incompatibility phenomenon. The prominent reaction types in a SATC process are hydrocracking, hydrodesulfurization, hydrodenitrogenation, thermal cracking, hydrogenation, and oligomerization reactions. It is very difficult to completely isolate these reactions from each other, but the selectivity of one reaction over the others can be increased by the selection of appropriate catalyst and process conditions. However thermodynamics and the required process conditions for these reactions can be very different, especially for thermal cracking and hydrogenation reactions. Achieving the target hydrotreated tar product quality in a single fixed bed reactor is very difficult due to the aforementioned differences in the nature of the reactions taking place in the SATC process. Moreover, if the reaction conditions are not selected properly, the SATC reactor can undergo premature plugging due to incompatibility. Unselective hydrogenation of molecules in the solvent range can reduce the solvency power of the feed and the precipitation of asphaltenes can occur when the difference between the solubility blend number and the insolubility number is reduced.

In general, the at least two stage process can be run at lower pressure and/or higher weight hour space velocity (WHSV) than a single stage while achieving similar or superior hydrogen penetration to upgrade the pyrolysis tar. The embodiments below include exemplary configurations of the process and apparatus for implementing the process. These configurations demonstrate advantages of a two hydroprocessing zone process that include at least: i) a higher degree of penetration of input hydrogen into the desired hydroprocessing product is obtained at a lower operating pressure and higher space velocity and ii) a lessening or prevention of saturation of the solvent (utility fluid) molecules which extends run length. Run length is believed to be extended by mitigating at least two fouling causes: i) lowered solvent SBN leading to precipitation of asphaltenes due to incompatibility and ii) catalyst deactivation, most likely via accumulation of carbonaceous deposits. Further, it has been discovered that the at least two stage process produces a first hydroprocessed product from which a mid-cut stream may be separated. The process described herein may be performed such that the mid-cut stream produced has increased compatibility with pyrolysis tar, so that the mid-cut stream is recycled and used as the utility fluid in at least a first hydroprocessing zone to advantageously reduce viscosity of the feedstock and assist with flowability of the tar through the process.

Thus, in various aspects, a multi-stage hydrocarbon conversion process is provided herein. The hydrocarbon conversion process comprises: (a) hydroprocessing a feedstock comprising pyrolysis tar in a first hydroprocessing zone by contacting the feedstock with at least one hydroprocessing catalyst in the presence of a utility fluid and molecular hydrogen under catalytic hydroprocessing conditions to convert at least a portion of the feedstock to a first hydroprocessed product; (b) separating from the first hydroprocessed product in one or more separation stages: (i) an overhead stream comprising ≥about 1.0 wt % of the first hydroprocessed product, (ii) a mid-cut stream comprising ≥about 20 wt % of the first hydroprocessed product and having a boiling point distribution from about 120° C. to about 480° C. as measured according to ASTM D7500, and (iii) a bottoms stream comprising ≥about 20 wt % of the first hydroprocessed product; (c) recycling at least a portion of the mid-cut stream for use as the utility fluid in the first hydroprocessing zone; and (d) hydroprocessing at least a portion of the bottoms stream in a second hydroprocessing zone by contacting the bottoms stream with at least one hydroprocessing catalyst in the presence of molecular hydrogen under catalytic hydroprocessing conditions to convert at least a portion of the bottoms stream to a second hydroprocessed product.

The multi-stage configuration provides a second stage (or final stage if more than two hydroprocessing stages are used) hydroprocessed product that has significantly improved viscosity, density, and sulfur content. The second stage hydroprocessed product has one or more of i) a sulfur content 1.5 wt % or less, e.g. 1.0 wt % or less, or 0.5 wt % or less; ii) product viscosity of 30 cSt at 50° C. or less, preferably ≤20 cSt at 50° C. or ≤15 cSt at 50° C.; and iii) density ≤1.00 g/cm$^3$ measured at 15° C.

A. Feedstock

The feedstock comprises tar, e.g., ≥10 wt % tar hydrocarbon based on the weight of the feedstock, and can include >15 wt %, >20 wt %, >30 wt % or up to about 50 wt % tar hydrocarbon. In particular, the tar in the feedstock is pyrolysis tar.

Pyrolysis tar in the feedstock can be produced by exposing a hydrocarbon-containing feed to pyrolysis conditions in order to produce a pyrolysis effluent, the pyrolysis effluent being a mixture comprising unreacted feed, unsaturated hydrocarbon produced from the feed during the pyrolysis, and pyrolysis tar. For example, a pyrolysis feedstock comprising ≥10 wt % hydrocarbon, based on the weight of the pyrolysis feedstock, is subjected to pyrolysis to produce a pyrolysis effluent, which generally contains pyrolysis tar and ≥1.0 wt % of C$_2$ unsaturates, based on the weight of the pyrolysis effluent. The pyrolysis tar generally comprises ≥90 wt % of the pyrolysis effluent's molecules having an atmospheric boiling point of ≥290° C. Thus, at least a portion of the pyrolysis tar is separated from the pyrolysis effluent to produce the feedstock for use in the multi-stage hydrocarbon conversion described herein, wherein the feedstock comprises ≥90 wt % of the pyrolysis effluent's molecules having an atmospheric boiling point of ≥290° C. Besides hydrocarbon, the pyrolysis feedstock optionally further comprises diluent, e.g., one or more of nitrogen, water, etc. For example, the pyrolysis feedstock may further comprise ≥1.0 wt % diluent based on the weight of the feed, such as ≥25.0 wt %. When the diluent includes an appreciable amount of steam, the pyrolysis is referred to as steam cracking. For the purpose of this description and appended claims, the following terms are defined.

The term "pyrolysis tar" means (a) a mixture of hydrocarbons having one or more aromatic components and optionally (b) non-aromatic and/or non-hydrocarbon molecules, the mixture being derived from hydrocarbon pyrolysis, with at least 70% of the mixture having a boiling point at atmospheric pressure that is ≥about 550° F. (290° C.). Certain pyrolysis tars have an initial boiling point ≥200° C. For certain pyrolysis tars, ≥90.0 wt % of the pyrolysis tar has a boiling point at atmospheric pressure ≥550° F. (290° C.). Pyrolysis tar can comprise, e.g., ≥50.0 wt %, e.g., ≥75.0 wt %, such as ≥90.0 wt %, based on the weight of the pyrolysis tar, of hydrocarbon molecules (including mixtures and aggregates thereof) having (i) one or more aromatic components and (ii) a number of carbon atoms ≥about 15. Pyrolysis tar generally has a metals content, ≤1.0×10$^3$ ppmw, based on the weight of the pyrolysis tar, which is an amount of metals that is far less than that found in crude oil (or crude oil components) of the same average viscosity. "SCT" means pyrolysis tar obtained from steam cracking, also referred to as steam-cracker tar. "Biomass pyrolysis tar" means pyrolysis tar obtained from thermal cracking of biomass. "Coal pyrolysis tar" means pyrolysis tar obtained from thermal cracking of hydrocarbons derived from coal.

"Tar Heavies" (TH) means a product of hydrocarbon pyrolysis, the TH having an atmospheric boiling point ≥565° C. and comprising ≥5.0 wt % of molecules having a plurality of aromatic cores based on the weight of the product. The TH are typically solid at 25.0° C. and generally include the fraction of SCT that is not soluble in a 5:1 (vol.:vol.) ratio of n-pentane: SCT at 25.0° C. TH generally include asphaltenes and other high molecular weight molecules.

In various aspects, the pyrolysis tar can be a SCT-containing tar stream (the "tar stream") from the pyrolysis effluent. Such a tar stream typically contains ≥90 wt % of SCT based on the weight of the tar stream, e.g., ≥95 wt %, such as ≥99 wt %, with the balance of the tar stream being particulates, for example. A pyrolysis effluent SCT generally comprises ≥10 wt % (on a weight basis) of the pyrolysis effluent's TH.

In certain embodiments, a SCT comprises ≥50 wt % of the pyrolysis effluent's TH based on the weight of the pyrolysis effluent's TH. For example, the SCT can comprise ≥90 wt % of the pyrolysis effluent's TH based on the weight of the pyrolysis effluent's TH. The SCT can have, e.g., (i) a sulfur content in the range of 0.5 wt % to 7.0 wt %, based on the weight of the SCT; (ii) a TH content in the range of from 5.0 wt % to 40.0 wt %, based on the weight of the SCT; (iii) a density at 15° C. in the range of 1.01 g/cm$^3$ to 1.15 g/cm$^3$, e.g., in the range of 1.07 g/cm$^3$ to 1.20 g/cm$^3$; and (iv) a 50° C. viscosity in the range of 200 cSt to 1.0×10$^7$ cSt. The amount of olefin in a SCT is generally ≤10.0 wt %, e.g., ≤5.0 wt %, such as ≤2.0 wt %, based on the weight of the SCT.

More particularly, the amount of (i) vinyl aromatics in a SCT and/or (ii) aggregates in a SCT that incorporates vinyl aromatics is generally ≤5.0 wt %, e.g., ≤3.0 wt %, such as ≤2.0 wt %, based on the weight of the SCT.

In certain aspects, the hydrocarbon component of the pyrolysis feedstock comprises≥of one or more of naphtha, gas oil, vacuum gas oil, waxy residues, atmospheric residues, residue admixtures, or crude oil; including those comprising≥about 0.1 wt % asphaltenes. For example, the hydrocarbon component of the pyrolysis feedstock comprises≥10.0 wt %, e.g., ≥50.0 wt %, such as ≥90.0 wt % (based on the weight of the hydrocarbon) one or more of naphtha, gas oil, vacuum gas oil, waxy residues, atmospheric residues, residue admixtures, or crude oil; including those comprising≥about 0.1 wt % asphaltenes. When the hydrocarbon includes crude oil and/or one or more fractions thereof, the crude oil is optionally desalted prior to being included in the pyrolysis feedstock. An example of a crude oil fraction utilized in the pyrolysis feedstock is produced by separating atmospheric pipestill ("APS") bottoms from a crude oil followed by vacuum pipestill ("VPS") treatment of the APS bottoms.

Suitable crude oils include, e.g., high-sulfur virgin crude oils, such as those rich in polycyclic aromatics. For example, the pyrolysis feedstock's hydrocarbon can include ≥90.0 wt % of one or more crude oils and/or one or more crude oil fractions, such as those obtained from an atmospheric APS and/or VPS; waxy residues; atmospheric residues; naphthas contaminated with crude; various residue admixtures; and SCT.

In some aspects, the tar in the pyrolysis effluent (e.g., a pyrolysis tar) can comprise (i)≥10.0 wt % of molecules having an atmospheric boiling point≥about 565° C. that are not asphaltenes, and (ii)≤about $1.0 \times 10^3$ ppmw metals.

Alternatively, a tar stream can be obtained, e.g., from a steam cracked gas oil ("SCGO") stream and/or a bottoms stream of a steam cracker's primary fractionator, from flash-drum bottoms (e.g., the bottoms of one or more flash drums located downstream of the pyrolysis furnace and upstream of the primary fractionator), or a combination thereof. For example, the tar stream can be a mixture of primary fractionator bottoms and tar knock-out drum bottoms.

Embodiments of the invention include a tar feed stream comprising one or more of steam cracked tar, coal pyrolysis tar, and biomass pyrolysis tar.

In various aspects, the tar in the feedstock (e.g., pyrolysis tar) has an $I_N \geq 80$. For example, the tar in the feedstock (e.g., pyrolysis tar) can have an $I_N \geq 85$, $I_N \geq 90$, $I_N \geq 100$, $I_N \geq 110$, $I_N \geq 120$, $I_N \geq 130$ or $I_N \geq 135$.

Additionally, the $S_{BN}$ of the tar in the feedstock (e.g., pyrolysis tar) can be as low as $S_{BN} \geq 130$, but is typically $S_{BN} \geq 140$, $S_{BN} \geq 145$, $S_{BN} \geq 150$, $S_{BN} \geq 160$, $S_{BN} \geq 170$, $S_{BN} \geq 175$ or even $S_{BN} \geq 180$. In some instances, the tar can be one having $S_{BN} \geq 200$, $S_{BN} \geq 200$, even an $S_{BN}$ about 240.

Further, the tar in the feedstock (e.g., pyrolysis tar) can include up to 50 wt % of C7 insolubles. Generally, the tar can have as much as 15 wt % C7 insolubles, or up to 25% C7 insolubles, or up to 30 wt % C7 insolubles, or up to 45% C7 insolubles. Thus, the tar may include from 15-50 wt % C7 insolubles, or 30-50 wt % C7 insolubles.

In particular, a tar to which the process can be advantageously applied is a pyrolysis tar having $I_N$ 110-135, $S_{BN}$ 180-240 and C7 insolubles content of 30-50 wt %.

B. Hydroprocessing

The hydroprocessing is carried out under hydroprocessing conditions, e.g., under conditions for carrying out one or more of hydrocracking (including selective hydrocracking), hydrogenation, hydrotreating, hydrodesulfurization, hydrodenitrogenation, hydro demetallation, hydrodearomatization, hydroisomerization, or hydrodewaxing. Hydroprocessing is carried out in the at least two reaction zones in series. The two reaction zones are typically in two reactors, but can be set up in two parts of a single reactor so long as the mid-cut is separated and removed between the first and second zone.

The hydroprocessing is performed in a first hydroprocessing zone by contacting the feedstock with at least one hydroprocessing catalyst in the presence of a utility fluid and molecular hydrogen under catalytic hydroprocessing conditions to convert at least a portion of the feedstock to a first hydroprocessed product. A mid-cut stream is separated comprising ≥ about 20 wt % of the first hydroprocessed product and having a having a boiling point distribution from about 120° C. to about 480° C. as measured according to ASTM D7500. Preferably, the mid-cut is recycled as utility fluid in the in the first hydroprocessing zone. A bottoms stream is also separated comprising ≥ about 20 wt % of the first hydroprocessed product. At least a portion of the bottoms stream in hydroprocessed in a second hydroprocessing zone by contacting the bottoms stream with at least one hydroprocessing catalyst in the presence of molecular hydrogen under catalytic hydroprocessing conditions to convert at least a portion of the bottoms stream to a second hydroprocessed product.

The multi-stage process enables the production of an on-spec SATC product (e.g. sulfur content 1.5 wt % or less, e.g. 1.0 wt % or less, or 0.5 wt % or less; product viscosity as low as 30 cSt at 50° C. or less, preferably ≤20 cSt at 50° C. or ≤15 cSt at 50° C.; and density ≤1.00 $g/cm^3$) from any type of tar, typically a steam cracked tar, for a sustainable duration of reactor life-time without plugging the reactor (e.g., 1 year or longer).

Independently, or in combination with any particular arrangement of the catalysts in the different hydroprocessing zones, the temperature in the first hydroprocessing zone can range from about 200-450° C. or about 200-425° C. and the temperature in the second hydroprocessing zone can range from about 300-450° C. or about 350-425° C. and vice versa. In some instances, the temperature in the first hydroprocessing zone can be higher than the temperature in the second hydroprocessing zone and vice versa. Alternatively, the temperature may be the same in the first and second hydroprocessing zones.

In any configuration of the process, the hydroprocessing conditions can comprise a pressure of from about 600-2000 psig, about 600-1900 psig, about 800-1600 psig, about 1000-1400 psig, about 1000-1200 psig, about 1100-1600 psig or about 1100-1300 psig. In some aspects, a pressure range of about 1000-1800 psig is typically used in a process in which a predominantly hydrotreating process is applied first, and a predominantly hydrocracking process is applied second.

In any configuration of the process, hydrogen ("makeup hydrogen") can be added to a feed or quench at a rate sufficient to maintain a H2 partial pressure of from 700 psig to 1500 psig in a hydroprocessing zone.

In any configuration of the process, the pressure in the hydroprocessing zone can be >2000 psig.

In any configuration of the process, the tar in the feedstock (e.g., pyrolysis tar) can have $I_N \geq 100$ and (i) the hydrotreating is conducted continuously in the hydrotreating zone from a first time $t_1$ to a second time $t_2$, $t_2$ being $\geq (t_1 + 80$ days) and (ii) the pressure drop in the hydrotreating zone at the second time increases ≤10.0% over the pressure drop at the first time.

In various aspects, the feedstock is heated before the feedstock is hydroprocessed in the first hydroprocessing zone. For example, the feedstock is mixed with a treat gas comprising molecular hydrogen and the mixture is heated, e.g., in a heat exchanger. The ratio of $H_2$:feed is typically 3000 scfb, but may be varied, e.g., from about 2000 scfb to about 3500 scfb, or from about 2500-3200 scfb.

The mixed feed can then be further heated, usually to a temperature from 200° C. to 425° C., and is then fed into the first hydroprocessing zone. The feed is contacted with a catalyst under catalytic hydroprocessing conditions as described herein to produce a first hydroprocessed product.

C. Utility Fluid

As discussed above, it has been discovered that a utility fluid with improved compatibility with the tar (e.g., pyrolysis tar) can be advantageously obtained through use of at least two hydroprocessing zones as described herein while also achieving a final product that can undergo more extensive hydrogenation to promote sulfur, density and viscosity reduction.

In particular, the utility fluid may be obtained as a mid-cut stream separated from the first hydroprocessed product. Thus, the process provided herein includes separating the first hydroprocessed product in one or more separation stages into an overhead stream, a mid-cut stream and a bottoms stream. For example, the first hydroprocessed product may first be separated (e.g., in a flash drum) into a vapor portion and liquid portion, and the liquid portion may then be separated (e.g., in a distillation column) into the overhead stream, the mid-cut stream and the bottoms stream.

In various aspects, the overhead stream comprises ≥about 1.0 wt % (e.g., ≥5.0 wt %, or ≥10 wt %, etc.) of the first hydroprocessed product, the mid-cut stream comprises ≥about 20 wt % (e.g., ≥30 wt %, ≥40 wt %, ≥50 wt %, etc.) of the first hydroprocessed product, and the bottoms stream comprises ≥about 20 wt % (e.g., ≥30 wt %, ≥40 wt %, etc.) of the first hydroprocessed product. For example, the overhead stream comprises from about 1.0 wt % to about 20 wt %, about 5.0 wt % to about 15 wt %, or about 5.0 wt % to about 10 wt % of the first hydroprocessed product. The mid-cut stream comprises from about 20 wt % to about 70 wt %, about 30 wt % to about 70 wt, or about 40 wt % to about 60 wt % of the first hydroprocessed product. The bottoms stream comprises from about 10 wt % to about 60 wt %, about 20 wt % to about 60 wt %, or about 30 wt % to about 50 wt % of the first hydroprocessed product.

The bottoms stream may be optionally mixed with fresh treat gas (in the manner described above) and is contacted with at least one hydroprocessing catalyst as described herein under catalytic hydroprocessing conditions to convert at least a portion of the bottoms stream to a second hydroprocessed product. The bottoms stream, optionally with the fresh treat gas may be heated, e.g., in a heat exchanger, and/or then introduced into the second hydroprocessing zone and contacted with at least hydroprocessing catalyst under catalytic hydroprocessing conditions to convert at least a portion of the bottoms stream to the second hydroprocessed product. Optionally, at least a portion of the overhead stream may be blended with the second hydroprocessed product. In various aspects, the weight hourly space velocity (WHSV) of the feedstock through the first hydroprocessing zone and/or the bottoms stream through the second hydroprocessing zone is about 0.5 hr$^{-1}$ to about 4.0 hr$^{-1}$, preferably about 0.7 hr$^{-1}$ to about 4.0 hr$^{-1}$.

Compatibility of a utility fluid and tar is based on comparing the $S_{BN}$ of a mixture of the utility fluid and tar with the $I_N$ of the tar. For example, for SCT, a utility fluid may be considered compatible with SCT, if a mixture of utility fluid and SCT has an $S_{BN}$ value ≥than the SCT's $I_N$ value. In other words, if an SCT has an $I_N$ of 80, a mixture of a utility fluid and the SCT would be considered compatible if the mixture of the utility fluid and the SCT has an $S_{BN}$ of >80, ≥90, ≥100, ≥110, or ≥120.

However, a mid-cut stream's $S_{BN}$ can be affected by hydroprocessing conditions. For example, as conditions are adjusted to (e.g., higher pressure, lower WHSV) to improve the product quality, the mid-cut stream may become further hydrogenated, which may reduce the mid-cut stream's $S_{BN}$. A reduced $S_{BN}$ of the mid-cut stream can be problematic when blending with the tar because a lower $S_{BN}$ can render the mid-cut stream incompatible with the tar, which can lead to fouling and plugging of the reactor.

It was discovered that a process using at least two hydroprocessing zones, where the mid-cut stream is separated from the first hydroprocessed zone as described herein can produce a mid-cut stream having a composition and a boiling range rendering it especially useful as a utility fluid in various hydrocarbon conversion process, e.g., hydroprocessing. In particular, the mid-cut stream advantageously has increased compatibility with the tar (e.g., pyrolysis tar) in the feedstock. Due to increased compatibility with the tar, when the mid-cut stream is used during hydroprocessing as the utility fluid, there may be significantly less fouling in the hydroprocessing reactor and ancillary equipment, resulting in increased hydroprocessing run length. In various aspects, the mid-cut stream has an $S_{BN}$ of ≥about 100, ≥about 110, ≥about 120, ≥about 130, ≥about 140, ≥150, or ≥160.

Thus, at least a portion of the mid-cut stream is then recycled (i.e., interstage recycle) for use as the utility fluid in the first hydroprocessing zone. For example, ≥about 20 wt %, ≥about 30 wt %, ≥about 40 wt %, ≥about 50 wt %, ≥about 60 wt %, ≥about 70 wt %, ≥about 80 wt % of the mid-cut stream is recycled for use as the utility fluid in the first hydroprocessing zone.

It is observed that a supplemental utility fluid may be needed under certain operating conditions, e.g., when starting the process (until sufficient utility fluid is available from the first hydroprocessed product as the mid-cut stream), or when operating at higher reactor pressures.

Accordingly, a supplemental utility fluid, such as a solvent, a solvent mixture, steam cracked naphtha (SCN), steam cracked gas oil (SCGO), or a fluid comprising aromatics (i.e., comprises molecules having at least one aromatic core) may optionally be added, e.g., to start-up the process. In certain aspects, the supplemental utility fluid comprises ≥50.0 wt %, e.g., ≥75.0 wt %, such as ≥90.0 wt % of aromatics and/or non-aromatics, based on the weight of the supplemental utility fluid. The supplemental utility fluid can have an ASTM D86 10% distillation point ≥60° C. and a 90% distillation point ≤350° C. Optionally, the utility fluid (which can be a solvent or mixture of solvents) has an ASTM D86 10% distillation point ≥120° C., e.g., ≥140° C., such as ≥150° C. and/or an ASTM D86 90% distillation point ≤300° C.

Optionally, the supplemental utility fluid comprises ≥90.0 wt % based on the weight of the utility fluid of one or more of benzene, ethylbenzene, trimethylbenzene, xylenes, toluene, naphthalenes, alkylnaphthalenes (e.g., methylnaphthalenes), tetralins, or alkyltetralins (e.g., methyltetralins), e.g., ≥95.0 wt %, such as ≥99.0 wt %. It is generally desirable for the supplemental utility fluid to be substantially free of molecules having alkenyl functionality, particularly in aspects utilizing a hydroprocessing catalyst having a tendency for coke formation in the presence of such molecules. In certain aspects, the supplemental utility fluid comprises ≤10.0 wt % of ring compounds having C1-C6 sidechains with alkenyl functionality, based on the weight of the utility fluid. One suitable supplemental utility fluid is A200 solvent, available from ExxonMobil Chemical Company (Houston, Tex.) as Aromatic 200, CAS number 64742-94-5.

The relative amounts of utility fluid (e.g., mid-cut stream, supplemental utility fluid) and tar stream employed during hydroprocessing are generally in the range of from about 20.0 wt % to about 95.0 wt % of the tar stream and from about 5.0 wt % to about 80.0 wt % of the utility fluid, based on total weight of the combined utility fluid and tar stream. For example, the relative amounts of utility fluid (e.g., mid-cut stream, supplemental utility fluid) and tar stream during hydroprocessing can be in the range of (i) about 20.0 wt % to about 90.0 wt % of the tar stream and about 10.0 wt % to about 80.0 wt % of the utility fluid, or (ii) from about 40.0 wt % to about 90.0 wt % of the tar stream and from about 10.0 wt % to about 60.0 wt % of the utility fluid. In one embodiment, the utility fluid (e.g., mid-cut stream, supplemental utility fluid): tar weight ratio can be ≥0.01, e.g., in the range of 0.05 to 4.0, such as in the range of 0.1 to 3.0, or 0.3 to 1.1.

At least a portion of the utility fluid (e.g., mid-cut stream, supplemental utility fluid) can be combined with at least a portion of the tar stream within the first hydroprocessing vessel or first hydroprocessing zone, but this is not required, and in one or more embodiments at least a portion of the utility fluid (e.g., mid-cut stream, supplemental utility fluid) and at least a portion of the tar stream are supplied as separate streams and combined into one feed stream prior to entering (e.g., upstream of) the hydroprocessing stage(s). For example, the tar stream and utility fluid (e.g., mid-cut stream, supplemental utility fluid) can be combined to produce a feedstock upstream of the hydroprocessing stage (e.g., first hydroprocessing zone), the feedstock comprising, e.g., (i) about 20.0 wt % to about 90.0 wt % of the tar stream and about 10.0 wt % to about 80.0 wt % of the utility fluid (e.g., mid-cut stream, supplemental utility fluid), or (ii) from about 40.0 wt % to about 90.0 wt % of the tar stream and from about 10.0 wt % to about 60.0 wt % of the utility fluid (e.g., mid-cut stream, supplemental utility fluid), the weight percents being based on the weight of the feedstock.

In some embodiments, the mixture of utility fluid (e.g., mid-cut stream, supplemental utility fluid) and pyrolysis tar has an $S_{BN}$ value about 20 points >an $I_N$ of the pyrolysis tar. For example, in such instances, where the pyrolysis tar has an $I_N$>80, the mixture of utility fluid and pyrolysis tar has an $S_{BN}$ of at least ≥100. Particularly, the mixture of utility fluid (e.g., mid-cut stream, supplemental utility fluid) and pyrolysis tar has an $S_{BN}$ value about 30 points ≥an $I_N$ of the pyrolysis tar or the mixture of utility fluid and pyrolysis tar has an $S_{BN}$ value about 40 points >an $I_N$ of the pyrolysis tar.

In some embodiments, the mixture of utility fluid (e.g., mid-cut stream, supplemental utility fluid) and pyrolysis tar has an $S_{BN}$≥110. Thus, it has been found that there is a beneficial decrease in reactor plugging when hydroprocessing pyrolysis tars having incompatibility number ($I_N$)≥80 if, after being combined, the utility fluid (e.g., mid-cut stream, supplemental utility fluid) and tar mixture has an $S_{BN}$≥110, ≥120, or ≥130. Additionally, it has been found that there is a beneficial decrease in reactor plugging when hydroprocessing pyrolysis tars having $I_N$≥110 if, after being combined, the utility fluid (e.g., mid-cut stream, supplemental utility fluid) and tar mixture has an $S_{BN}$≥150, ≥155, or ≥160.

D. Catalysts

Conventional hydroprocessing catalysts can be utilized for hydroprocessing the feedstock (e.g., pyrolysis tar) as described herein in the at least two hydroprocessing zones as described herein. Suitable hydroprocessing catalysts for use in the at least two hydroprocessing zones include those comprising (i) one or more bulk metals and/or (ii) one or more metals on a support. The metals can be in elemental form or in the form of a compound. In one or more embodiments, the hydroprocessing catalyst includes at least one metal from any of Groups 5 to 10 of the Periodic Table of the Elements (tabulated as the Periodic Chart of the Elements, The Merck Index, Merck & Co., Inc., 1996). Examples of such catalytic metals include, but are not limited to, vanadium, chromium, molybdenum, tungsten, manganese, technetium, rhenium, iron, cobalt, nickel, ruthenium, palladium, rhodium, osmium, iridium, platinum, or mixtures thereof.

In one or more embodiments, the catalyst has a total amount of Groups 5 to 10 metals per gram of catalyst of at least 0.0001 grams, or at least 0.001 grams or at least 0.01 grams, in which grams are calculated on an elemental basis. For example, the catalyst can comprise a total amount of Group 5 to 10 metals in a range of from 0.0001 grams to 0.6 grams, or from 0.001 grams to 0.3 grams, or from 0.005 grams to 0.1 grams, or from 0.01 grams to 0.08 grams. In a particular embodiment, the catalyst further comprises at least one Group 15 element. An example of a preferred Group 15 element is phosphorus. When a Group 15 element is utilized, the catalyst can include a total amount of elements of Group 15 in a range of from 0.000001 grams to 0.1 grams, or from 0.00001 grams to 0.06 grams, or from 0.00005 grams to 0.03 grams, or from 0.0001 grams to 0.001 grams, in which grams are calculated on an elemental basis.

In an embodiment, the catalyst comprises at least one Group 6 metal. Examples of preferred Group 6 metals include chromium, molybdenum and tungsten. The catalyst may contain, per gram of catalyst, a total amount of Group 6 metals of at least 0.00001 grams, or at least 0.01 grams, or at least 0.02 grams, in which grams are calculated on an elemental basis. For example, the catalyst can contain a total amount of Group 6 metals per gram of catalyst in the range of from 0.0001 grams to 0.6 grams, or from 0.001 grams to 0.3 grams, or from 0.005 grams to 0.1 grams, or from 0.01 grams to 0.08 grams, the number of grams being calculated on an elemental basis.

In related embodiments, the catalyst includes at least one Group 6 metal and further includes at least one metal from Group 5, Group 7, Group 8, Group 9, or Group 10. Such catalysts can contain, e.g., the combination of metals at a molar ratio of Group 6 metal to Group 5 metal in a range of from 0.1 to 20, 1 to 10, or 2 to 5, in which the ratio is on an elemental basis. Alternatively, the catalyst can contain the combination of metals at a molar ratio of Group 6 metal to a total amount of Groups 7 to 10 metals in a range of from 0.1 to 20, 1 to 10, or 2 to 5, in which the ratio is on an elemental basis.

When the catalyst includes at least one Group 6 metal and one or more metals from Groups 9 or 10, e.g., molybdenum-cobalt and/or tungsten-nickel, these metals can be present, e.g., at a molar ratio of Group 6 metal to Groups 9 and 10 metals in a range of from 1 to 10, or from 2 to 5, in which the ratio is on an elemental basis. When the catalyst includes at least one of Group 5 metal and at least one Group 10 metal, these metals can be present, e.g., at a molar ratio of Group 5 metal to Group 10 metal in a range of from 1 to 10, or from 2 to 5, where the ratio is on an elemental basis. Additionally, the catalyst may further comprise inorganic oxides, e.g., as a binder and/or support. For example, the catalyst can comprise (i) ≥1.0 wt % of one or more metals selected from Groups 6, 8, 9, and 10 of the Periodic Table and (ii) ≥1.0 wt % of an inorganic oxide, the weight percents being based on the weight of the catalyst.

In one or more embodiments, the catalyst (e.g., in the first and/or second hydroprocessing zone) is a bulk multimetallic hydroprocessing catalyst with or without binder. In an embodiment the catalyst is a bulk trimetallic catalyst comprised of two Group 8 metals, preferably Ni and Co and one Group 6 metal, preferably Mo.

This disclosure also include incorporating into (or depositing on) a support one or catalytic metals e.g., one or more metals of Groups 5 to 10 and/or Group 15, to form the hydroprocessing catalyst. The support can be a porous material. For example, the support can comprise one or more refractory oxides, porous carbon-based materials, zeolites, or combinations thereof suitable refractory oxides include, e.g., alumina, silica, silica-alumina, titanium oxide, zirconium oxide, magnesium oxide, and mixtures thereof. Suitable porous carbon-based materials include activated carbon and/or porous graphite. Examples of zeolites include, e.g., Y-zeolites, beta zeolites, mordenite zeolites, ZSM-5 zeolites, and ferrierite zeolites. Additional examples of support materials include gamma alumina, theta alumina, delta alumina, alpha alumina, or combinations thereof. The amount of gamma alumina, delta alumina, alpha alumina, or combinations thereof, per gram of catalyst support, can be in a range of from 0.0001 grams to 0.99 grams, or from 0.001 grams to 0.5 grams, or from 0.01 grams to 0.1 grams, or at most 0.1 grams, as determined by x-ray diffraction. In a particular embodiment, the hydroprocessing catalyst (e.g., in the first and/or second hydroprocessing zone) is a supported catalyst, and the support comprises at least one alumina, e.g., theta alumina, in an amount in the range of from 0.1 grams to 0.99 grams, or from 0.5 grams to 0.9 grams, or from 0.6 grams to 0.8 grams, the amounts being per gram of the support. The amount of alumina can be determined using, e.g., x-ray diffraction. In alternative embodiments, the support can comprise at least 0.1 grams, or at least 0.3 grams, or at least 0.5 grams, or at least 0.8 grams of theta alumina.

When a support is utilized, the support can be impregnated with the desired metals to form the hydroprocessing catalyst. The support can be heat-treated at temperatures in a range of from 400° C. to 1200° C., or from 450° C. to 1000° C., or from 600° C. to 900° C., prior to impregnation with the metals. In certain embodiments, the hydroprocessing catalyst can be formed by adding or incorporating the Groups 5 to 10 metals to shaped heat-treated mixtures of support. This type of formation is generally referred to as overlaying the metals on top of the support material. Optionally, the catalyst is heat treated after combining the support with one or more of the catalytic metals, e.g., at a temperature in the range of from 150° C. to 750° C., or from 200° C. to 740° C., or from 400° C. to 730° C. Optionally, the catalyst is heat treated in the presence of hot air and/or oxygen-rich air at a temperature in a range between 400° C. and 1000° C. to remove volatile matter such that at least a portion of the Groups 5 to 10 metals are converted to their corresponding metal oxide. In other embodiments, the catalyst can be heat treated in the presence of oxygen (e.g., air) at temperatures in a range of from 35° C. to 500° C., or from 100° C. to 400° C., or from 150° C. to 300° C. Heat treatment can take place for a period of time in a range of from 1 to 3 hours to remove a majority of volatile components without converting the Groups 5 to 10 metals to their metal oxide form. Catalysts prepared by such a method are generally referred to as "uncalcined" catalysts or "dried." Such catalysts can be prepared in combination with a sulfiding method, with the Groups 5 to 10 metals being substantially dispersed in the support. When the catalyst comprises a theta alumina support and one or more Groups 5 to 10 metals, the catalyst is generally heat treated at a temperature ≥400° C. to form the hydroprocessing catalyst. Typically, such heat treating is conducted at temperatures ≤1200° C.

In one or more embodiments, the hydroprocessing catalysts usually include transition metal sulfides dispersed on high surface area supports. The structure of the typical hydrotreating catalysts is made of 3-15 wt % Group 6 metal oxide and 2-8 wt % Group 8 metal oxide and these catalysts are typically sulfided prior to use.

The catalyst can be in shaped forms, e.g., one or more of discs, pellets, extrudates, etc., though this is not required. Non-limiting examples of such shaped forms include those having a cylindrical symmetry with a diameter in the range of from about 0.79 mm to about 3.2 mm ($\frac{1}{32}^{nd}$ to $\frac{1}{8}^{th}$ inch), from about 1.3 mm to about 2.5 mm ($\frac{1}{20}^{th}$ to $\frac{1}{10}^{th}$ inch), or from about 1.3 mm to about 1.6 mm ($\frac{1}{20}^{th}$ to $\frac{1}{16}^{th}$ inch). Similarly-sized non-cylindrical shapes are also contemplated herein, e.g., trilobe, quadralobe, etc. Optionally, the catalyst has a flat plate crush strength in a range of from 50-500 N/cm, or 60-400 N/cm, or 100-350 N/cm, or 200-300 N/cm, or 220-280 N/cm.

Porous catalysts, including those having conventional pore characteristics, are within the scope of the invention. When a porous catalyst is utilized, the catalyst can have a pore structure, pore size, pore volume, pore shape, pore surface area, etc., in ranges that are characteristic of conventional hydroprocessing catalysts, though the invention is not limited thereto. Since feedstock (e.g., pyrolysis tar) can consist of fairly large molecules, catalysts with large pore size are preferred, especially at reactor locations where the catalyst and feed first meet. For example, the catalyst can have a median pore size that is effective for hydroprocessing SCT molecules, such catalysts having a median pore size in the range of from 30 Å to 1000 Å, or 50 Å to 500 Å, or 60 Å to 300 Å. Further, catalysts with bi-modal pore system, having 150-250 Å pores with feeder pores of 250-1000 Å in the support are more favorable. Pore size can be determined according to ASTM Method D4284-07 Mercury Porosimetry.

In a particular embodiment, the hydroprocessing catalyst (e.g., in the first and/or second hydroprocessing zone) has a median pore diameter in a range of from 50 Å to 200 Å. Alternatively, the hydroprocessing catalyst has a median pore diameter in a range of from 90 Å to 180 Å, or 100 Å to 140 Å, or 110 Å to 130 Å. In another embodiment, the hydroprocessing catalyst has a median pore diameter ranging from 50 Å to 150 Å. Alternatively, the hydroprocessing catalyst has a median pore diameter in a range of from 60 Å to 135 Å, or from 70 Å to 120 Å. In yet another alternative, hydroprocessing catalysts having a larger median pore diameter are utilized, e.g., those having a median pore diameter in a range of from 180 Å to 500 Å, or 200 Å to 300 Å, or 230 Å to 250 Å.

Generally, the hydroprocessing catalyst has a pore size distribution that is not so great as to significantly degrade catalyst activity or selectivity. For example, the hydroprocessing catalyst can have a pore size distribution in which at least 60% of the pores have a pore diameter within 45 Å, 35

Å, or 25 Å of the median pore diameter. In certain embodiments, the catalyst has a median pore diameter in a range of from 50 Å to 180 Å, or from 60 Å to 150 Å, with at least 60% of the pores having a pore diameter within 45 Å, 35 Å, or 25 Å of the median pore diameter.

When a porous catalyst is utilized, the catalyst can have, e.g., a pore volume $\geq 0.3$ cm$^3$/g, such $\geq 0.7$ cm$^3$/g, or $\geq 0.9$ cm$^3$/g. In certain embodiments, pore volume can range, e.g., from 0.3 cm$^3$/g to 0.99 cm$^3$/g, 0.4 cm$^3$/g to 0.8 cm$^3$/g, or 0.5 cm$^3$/g to 0.7 cm$^3$/g.

In certain embodiments, a relatively large surface area can be desirable. As an example, the hydroprocessing catalyst can have a surface area $\geq 60$ m$^2$/g, or $\geq 100$ m$^2$/g, or $\geq 120$ m$^2$/g, or $\geq 170$ m$^2$/g, or $\geq 220$ m$^2$/g, or $\geq 270$ m$^2$/g; such as in the range of from 100 m$^2$/g to 300 m$^2$/g, or 120 m$^2$/g to 270 m$^2$/g, or 130 m$^2$/g to 250 m$^2$/g, or 170 m$^2$/g to 220 m$^2$/g.

Conventional hydroprocessing catalysts for use in the hydroprocessing zones can be used, but the invention is not limited thereto. In certain embodiments, the catalysts include one or more of KF860 available from Albemarle Catalysts Company LP, Houston Tex.; Nebula® Catalyst, such as Nebula® 20, available from the same source; Centera® catalyst, available from Criterion Catalysts and Technologies, Houston Tex., such as one or more of DC-2618, DN-2630, DC-2635, and DN-3636; Ascent® Catalyst, available from the same source, such as one or more of DC-2532, DC-2534, and DN-3531; and FCC pretreat catalyst, such as DN3651 and/or DN3551, available from the same source. However, the invention is not limited to only these catalysts.

Hydroprocessing the specified amounts of tar stream and utility fluid using the specified hydroprocessing catalyst and specified utility fluid leads to improved catalyst life, e.g., allowing the hydroprocessing stage to operate for at least 3 months, or at least 6 months, or at least 1 year without replacement of the catalyst in the hydroprocessing or contacting zones. Catalyst life is generally >10 times longer than would be the case if no utility fluid were utilized, e.g., $\geq 100$ times longer, such as $\geq 1000$ times longer.

In a particular embodiment, the catalyst in the first hydroprocessing zone can be one that comprises one or more of Ni, Mo, W, Pd, and Pt, supported on amorphous Al$_2$O$_3$ and/or SiO$_2$ (ASA). Exemplary catalysts for use in a hydroprocessing zone, which hydroprocessing can be the first treatment applied to the feedstock tar, are a Ni—Co—Mo/Al$_2$O$_3$ type catalyst, or Pt—Pd/Al$_2$O$_3$—SiO$_2$, Ni—W/Al$_2$O$_3$, Ni—Mo/Al$_2$O$_3$, or Fe, Fe—Mo supported on a non-acidic support such as carbon black or carbon black composite, or Mo supported on a nonacidic support such as TiO$_2$ or Al$_2$O$_3$/TiO$_2$.

The catalyst in the second hydroprocessing zone can be one that comprises predominantly one or more of a zeolite or Co, Mo, P, Ni, Pd supported on ASA and/or zeolite. Exemplary catalysts for use in the second hydroprocessing zone are USY or VUSY Zeolite Y, Co—Mo/Al$_2$O$_3$, Ni—Co—Mo/Al$_2$O$_3$, Pd/ASA-Zeolite Y. The catalyst for each hydroprocessing zone maybe selected independently of the catalyst used in any other hydroprocessing zone; for example, RT-228 catalyst may be used in the first hydroprocessing zone, and RT-621 catalyst may be used in the second hydroprocessing zone.

In some aspects, a guard bed comprising an inexpensive and readily available catalyst, such as Co—Mo/Al$_2$O$_3$, followed by H$_2$S nd NH$_3$ removal is needed if the S and N content of the feed is too high and certain catalysts are used in the hydroprocessing zone (e.g., a zeolite). However, the guard bed may not be necessary when a zeolite catalyst is used in the second reactor because the sulfur and nitrogen levels will already be reduced in the first reactor. Steps for NH$_3$ and H$_2$S separation can still be applied to the products of both of the first hydroprocessing zone and the second hydroprocessing zone if desired.

In another particular embodiment, the catalyst in the first hydroprocessing zone can be one that comprises predominantly one or more of a zeolite or Co, Mo, P, Ni, Pd supported on ASA and/or zeolite, and the catalyst in the second hydroprocessing zone can be one that comprises one or more of Ni, Mo, W, Pd, and Pt, supported on amorphous Al$_2$O$_3$ and/or SiO$_2$ (ASA). In this configuration, the exemplary catalysts for use in the first hydroprocessing zone are USY or VUSY Zeolite Y, Co—Mo/Al$_2$O$_3$, Ni—Co—Mo/Al$_2$O$_3$, Pd/ASA-Zeolite Y and exemplary catalysts for use in the second hydroprocessing zone are a Ni—Co—Mo/Al$_2$O$_3$ type catalyst, or Pt—Pd/Al$_2$O$_3$—SiO$_2$, Ni—W/Al$_2$O$_3$, Ni—Mo/Al$_2$O$_3$, or Fe, Fe—Mo supported on a non-acidic support such as carbon black or carbon black composite, or Mo supported on a nonacidic support such as TiO$_2$ or Al$_2$O$_3$/TiO$_2$. The catalyst for each hydroprocessing zone maybe selected independently of the catalyst used in any other hydroprocessing zone; for example, RT-621 catalyst may be used in the first hydroprocessing zone, and RT-228 catalyst may be used in the second hydroprocessing zone.

In another embodiment, the catalyst in the first hydroprocessing zone can be the same catalyst or perform a similar function as the catalyst in the second hydroprocessing zone.

E. FIG. 1 Multi-Stage Embodiment

Referring now to FIG. 1, an embodiment of a multi-stage hydroprocessing process where a mid-cut stream is recycled for use as the utility fluid during the first stage is described.

A multi-stage hydroprocessing process 70 includes a feedstock stream 20 comprising tar (e.g., pyrolysis tar, such as SCT) is combined with a utility fluid which may be a mid-cut recycle 60. The combined feedstock is provided to a first hydroprocessing reactor 40. The combined feedstock stream optionally may first be heated in a first heat exchanger 37 to produce a heated feedstock stream 11. Following heating, the heated feedstock stream 11, in the presence of a first stage treat gas stream 13, such as molecular hydrogen, may be provided to a pre-treating reactor 36 to produce a pre-treated feedstock stream 19. The pre-treated feedstock stream 19 optionally may be further heated in a second heat exchanger 38 and a third heat exchanger 39 to produce heated pre-treated feedstock streams 10 and 12, respectively. The heated pre-treated feedstock stream 12 is hydroprocessed in a first hydroprocessing reactor 40 in the presence of the utility fluid, the treat gas, and one or more of the specified hydroprocessing catalysts to produce the first hydroprocessed product stream 21. The hydroprocessing catalyst is deployed within the first hydroprocessing reactor 40 in at least one catalyst bed. Intercooling quench streams 14, 16, and 18 using treat gas optionally may be provided between beds, if desired.

The first hydroprocessed product stream 21 can be cooled in the second heat exchanger 38 (where it is used as a heating medium to heat the pre-treated feedstock stream 19) to produce a cooled first hydroprocessed product stream 9. Following cooling, the cooled first hydroprocessed product stream 9 is conducted to a first separator 41 for separating first stage vapor product 5 (e.g., heteroatom vapor, vapor-phase cracked products, unused treat gas, etc.) and first stage liquid effluent 17 from the first hydroprocessed product stream 21. In one embodiment, the first separator 41 is a flash drum.

The first stage vapor product 5 is optionally conducted to an amine tower 42 (e.g., $H_2S$ scrubber) to produce upgraded treat gas stream 2 (e.g., hydrogen) substantially free of $H_2S$. Fresh amine 4 (e.g., monoethanolamine, methyldiethanolamine, diethanolamine, etc.) is provided to the amine tower 42 and rich amine 7 comprising $H_2S$ is conducted away from the amine tower 42. At least a portion of the upgraded treat gas stream 2 is optionally conducted away from amine tower 42, compressed in compressor 43, and re-used during hydroprocessing in the first and/or second stage. Treat gas, e.g., molecular hydrogen for starting up the process or for make-up, can be obtained from feed treat gas stream 1, if needed. A light gas purge stream 3 may be removed from the upgraded treat gas stream 2 as needed.

The first stage liquid effluent 17 is provide to a second separator 44 (e.g., distillation tower). An overhead stream 8 comprising from 1.0 wt % to 20 wt % of the first hydroprocessed product is separated. A mid-cut stream 15 comprising from 20 to 70 wt % of the first hydroprocessed product is separated. A bottoms stream 22 comprising from 10 to 60 wt % of the first hydroprocessed product is separated. At this point, the mid-cut stream 15 is recycled to be used as the utility fluid 60 in the first stage and/or carried away as a separate mid-cut product stream 61.

The bottoms stream 22 is pumped via pump 45 to a second stage where it is combined with a second stage treat gas stream 26 and heated in a fourth heat exchanger 46 to produce a second stage preheated feed stream 23. The second stage preheated feed stream 23 is hydroprocessed in a second hydroprocessing reactor 47 in the presence of the treat gas, and one or more of the specified hydroprocessing catalysts to produce the second hydroprocessed product stream 32. The hydroprocessing catalyst is deployed within the second hydroprocessing reactor 47 in at least one catalyst bed. Intercooling quench streams 27, 28, and 30 using treat gas optionally may be provided between beds, if desired.

The second hydroprocessed product stream 32 is conducted to a third separator 48 for separating second stage vapor product 29 (e.g., heteroatom vapor, vapor-phase cracked products, unused treat gas, etc.) and second stage liquid effluent 34 from the second hydroprocessed product stream 32. The second stage vapor product 29 is optionally cooled in fifth heat exchanger 49 to produce a cooled second stage vapor product stream 31. The cooled second stage vapor product stream 31 optionally may undergo further separation in a fourth separator 50 for separating a second stage vapor product stream 6 and a further recovered second stage liquid product 33. The second stage vapor product stream 6 optionally may be conducted to the amine tower 42 and optionally, combined with the first stage vapor product stream 5.

The second stage liquid effluent 34 and the further recovered second stage liquid product 33 is then provided to a fifth separator 51 (e.g., distillation tower), where a second stage product overhead stream 24 and a second stage liquid product stream 35 are separated. The second stage liquid product stream 35 can be utilized as a fuel oil, e.g., a heavy fuel oil. Additionally or alternatively, the second stage liquid product stream 35 optionally can be blended with a second hydrocarbon, e.g., a heavy hydrocarbon, such as fuel oil and/or heavy fuel oil. Advantageously, the second stage liquid product stream 35 has desirable blending characteristics, e.g., when blended with asphaltene-containing heavy oils, the resulting blend contains fewer precipitated particulates (such as fewer precipitated asphaltenes) than do blends of the pyrolysis tar feed with the same heavy oil.

EXAMPLES

In the case of SATC process, it is critical that hydrogen be applied to the "right" molecules to avoid deterioration of the solvent power of the mid-cut utility fluid. The following examples serve to illustrate how the inventive configuration allow both retained mid-cut solvent power and improved second stage product properties at commercially desirable run lengths.

Example 1

Comparative Two-stage Process without Inter-stage Mid-cut Separation

A two-stage process according to the conditions described was tested with the exception that mid-cut utility fluid was not separated between the first and second hydroprocessing stages. Instead, for this example a mid-cut utility fluid was taken from the second stage hydroprocessed product. A plugging event was observed after about 75 days on stream. At this time, the second stage product was analyzed and found that the SBN/IN was 97.5/97.5, within the incompatibility zone. Without being bound by any theory, it is believed the molecules providing the second stage mid-cut its solvency power were over-hydrogenated, leading to reactor plugging. This is because the density of a solvent is a function of the hydrogen content of the material. Thus as SATC mid-cut solvent is hydrogenated, both its density and SBN decrease.

Example 2

Single Stage vs. Multi-Stage with Interstage Mid-cut Recycle

Figure 2:
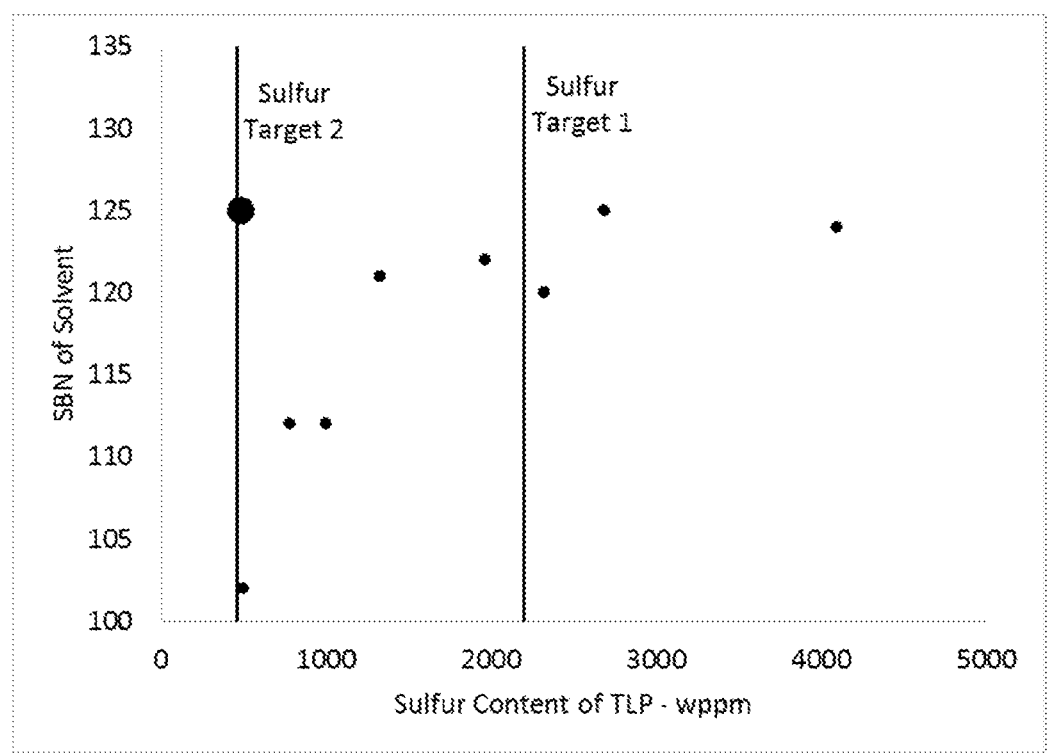
FIG. 2 illustrates a comparison of utility fluid recovery between a single stage hydroprocessing process and a multi-stage hydroprocessing process.

FIG. 2 illustrates the SBN of mid-cut solvent after a single stage of hydroprocessing. As hydroprocessing conditions are adjusted to reduce sulfur content below either of the fuel oil sulfur specifications (indicated by the vertical lines), the SBN of the mid-cut solvent is reduced. It is preferable to have SBN of the mid-cut above 120 to avoid potential for incompatibility. Thus the data in FIG. 2 indicates the two goals are mutually exclusive in a single stage configuration. The large dot (A) in FIG. 2 represents the SBN of a mid-cut taken from hydroprocessed product after a single stage of hydroprocessing sufficient to lower sulfur content to approximately 2700 wpppm in the first stage product. The large dot (A) also represents the sulfur content of the hydroprocessed product after a second stage of hydroprocessing. This represents an optimized case which provides sufficient SBN in the mid-cut solvent and desired sulfur content in the final (second stage) product.

Example 3

Multi-Stage with Interstage Mid-cut Recycle

Because of the conflicting nature of solvency power, which requires higher density per Example 1, and product quality specifications, which requires lower density to meet fuel oil specifications, a prophetic processing configuration according to FIG. 1 is proposed. This configuration decouples the first stage, where thermal cracking and the bulk of desulfurization and denitrification can occur, from the second stage, where hydrogenation of the product can be maximized. The first stage would be set near an equivalent isothermal temperature (EIT) of 400° C. to promote conversion of molecules boiling at or above 1050° F. (including some tar heavies) and to promote desulfurization. In the second stage, the operating temperature is lowered to promote hydrogenation of the polyaromatic species present in the product of the first stage.

At first stage operating conditions tested to date of 400° C. and one (1.0) hr$^{-1}$ weight hour space velocity (WHSV), the mid-cut solvent is anticipated to have an SBN of approximately 125 to 130, based on comparable single stage results described in Example 2. This configuration also benefits from removal of H$_2$S and NH$_3$ generated in the first stage through the flash recovery train prior to entering the second stage hydroprocessing.

Additionally, makeup hydrogen is introduced into the second stage to increase H2 partial pressure to promote hydrogenation and additional desulfurization of the final product to better meet fuel oil specifications.

All patents, test procedures, and other documents cited herein, including priority documents, are fully incorporated by reference to the extent such disclosure is not inconsistent and for all jurisdictions in which such incorporation is permitted. While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the example and descriptions set forth herein, but rather that the claims be construed as encompassing all the features of patentable novelty which reside herein, including all features which would be treated as equivalents thereof by those skilled in the art to which this disclosure pertains. When numerical lower limits and numerical upper limits are listed herein, ranges from any lower limit to any upper limit are contemplated.

What is claimed is:

1. A hydrocarbon conversion process comprising:
   (a) hydroprocessing a feedstock comprising pyrolysis tar in a first hydroprocessing zone by contacting the feedstock with at least one hydroprocessing catalyst in the presence of a utility fluid and molecular hydrogen under catalytic hydroprocessing conditions to convert at least a portion of the feedstock to a first hydroprocessed product;
   (b) separating the first hydroprocessed product in one or more separation stages to form:
      (i) an overhead stream comprising ≥about 1.0 wt % of the first hydroprocessed product;
      (ii) a mid-cut stream comprising ≥about 20 wt % of the first hydroprocessed product and having a having a boiling point distribution from about 120° C. to about 480° C. as measured according to ASTM D7500; and
      (iii) a bottoms stream comprising ≥about 10 wt % of the first hydroprocessed product;
   (c) recycling at least a portion of the mid-cut stream for use as the utility fluid in the first hydroprocessing zone; and
   (d) hydroprocessing at least a portion of the bottoms stream in a second hydroprocessing zone by contacting the bottoms stream with at least one hydroprocessing catalyst in the presence of molecular hydrogen under catalytic hydroprocessing conditions to convert at least a portion of the bottoms stream to a second hydroprocessed product, wherein the at least a portion of the bottoms stream is hydroprocessed in the second hydroprocessing zone in the absence of any utility fluid.

2. The process of claim 1, where the second hydroprocessed product has one or more of i) a sulfur content of 1.5 wt % or less, based on the weight of the second hydroprocessed product, ii) a viscosity of 30 cSt at 50° C. or less, and iii) a density at 15° C. of ≤1.00 g/cm$^3$.

3. The process of claim 1, further comprising:
   pyrolyzing a pyrolysis feedstock comprising ≥about 10 wt % of a hydrocarbon based on the weight of the pyrolysis feedstock to produce a pyrolysis effluent comprising tar and ≥about 1.0 wt % of C$_2$ unsaturates, based on the weight of the pyrolysis effluent; and
   separating at least a portion of the tar from the pyrolysis effluent to produce the hydroprocessing feedstock, wherein the hydroprocessing feedstock comprises ≥about 90 wt % of any molecules having an atmospheric boiling point of ≥about 290° C. contained in the pyrolysis effluent.

4. The process of claim 3, wherein the tar comprises:
   (i) ≥about 10 wt % of molecules having an atmospheric boiling point >about 565° C. that are not asphaltenes, based on the weight of the tar; and
   (ii) ≤about 1.0×10$^3$ ppmw metals, based on the weight of the tar.

5. The process of claim 3, wherein the hydrocarbon in the pyrolysis feedstock comprises one or more of naphtha, gas oil, vacuum gas oil, waxy residues, atmospheric residues, residue admixtures, or crude oil.

6. The process of claim 1, wherein the pyrolysis tar comprises one or more of steam-cracker tar, coal pyrolysis tar, and biomass pyrolysis tar.

7. The process of claim 1 further comprising heating the feedstock before hydroprocessing of the feedstock in the first hydroprocessing zone.

8. The process of claim 1, wherein:
   the overhead stream comprises from about 1.0 wt % to about 20 wt % of the first hydroprocessed product;
   the mid-cut stream comprises from about 20 wt % to about 70 wt % of the first hydroprocessed product; and
   the bottoms stream comprises from about 20 wt % to about 60 wt % of the first hydroprocessed product.

9. The process of claim 1, wherein >30 wt % of the mid-cut stream, based on the weight of the mid-cut stream, is recycled for use as the utility fluid in the first hydroprocessing zone.

10. The process of claim 1, wherein the mid-cut stream has a solubility blending number (SBN) of >about 100.

11. The process of claim 1, wherein the feedstock has a solubility blending number (SBN) of >about 140.

12. The process of claim 1, wherein the pyrolysis tar has an insolubility number (IN) of >about 80.

13. The process of claim 1, wherein a mixture of the pyrolysis tar and the mid-cut stream has a solubility blending number (SBN) that is at least 20 points >an insolubility number (IN) of the pyrolysis tar.

14. The process of claim 1, wherein, prior to production of the mid-cut stream, the utility fluid comprises a supplemental utility fluid comprising aromatic and non-aromatic ring compounds and has an ASTM D86 10% distillation point >about 60° C. and a 90% distillation point ≤about 350° C.

15. The process of claim 1, wherein the temperature in the first hydroprocessing zone is about 200° C. to about 450° C., and the temperature in the second hydroprocessing zone is about 300° C. to about 450° C.

16. The process of claim 1, wherein the catalytic hydroprocessing conditions in the first hydroprocessing zone and the second hydroprocessing zone comprise a pressure of about 600 psig to about 1900 psig.

17. The process of claim 1, wherein the weight hourly space velocity (WHSV) of the feedstock through the first hydroprocessing zone and/or the bottoms stream through the second hydroprocessing zone is about 0.5 $hr^{-1}$ to about 4.0 $hr^{-1}$.

18. The process of claim 1, further comprising blending at least a portion of the overhead stream with the second hydroprocessed product.

19. The process of claim 1, wherein the second hydroprocessed product has a density at 15° C. of ≤1.00 $g/cm^3$.

20. The process of claim 1, wherein the pyrolysis tar has an insolubility number (IN) of 110 to 135, a solubility blending number (SBN) of 180 to 240, and a C7 insolubles content of 30 wt % to 50 wt %, and wherein a mixture of the pyrolysis tar and the mid-cut stream has a solubility blending number (SBN) that is at least 20 points >the insolubility number (IN) of the pyrolysis tar.

\* \* \* \* \*